(12) United States Patent
Yazawa et al.

(10) Patent No.: US 7,990,654 B2
(45) Date of Patent: Aug. 2, 2011

(54) PERPENDICULAR MAGNETIC RECORDING HEAD

(75) Inventors: Hisayuki Yazawa, Niigata-ken (JP);
Takahiro Taoka, Niigata-ken (JP);
Hiroshi Kameda, Niigata-ken (JP)

(73) Assignee: TDK Corporation, Tokyo (JP)

( * ) Notice: Subject to any disclaimer, the term of this patent is extended or adjusted under 35 U.S.C. 154(b) by 746 days.

(21) Appl. No.: 12/038,294

(22) Filed: Feb. 27, 2008

(65) Prior Publication Data

US 2008/0239569 A1 Oct. 2, 2008

(30) Foreign Application Priority Data

Mar. 30, 2007 (JP) ................................ 2007-091519
May 29, 2007 (JP) ................................ 2007-142316

(51) Int. Cl.
*G11B 5/31* (2006.01)
(52) U.S. Cl. .................................................. 360/125.09
(58) Field of Classification Search ............... 360/125.09
See application file for complete search history.

(56) References Cited

U.S. PATENT DOCUMENTS

| | | | |
|---|---|---|---|
| 7,061,719 B2 * | 6/2006 | Matono et al. | 360/125.51 |
| 7,394,621 B2 * | 7/2008 | Li et al. | 360/125.15 |
| 7,518,826 B2 * | 4/2009 | Matono et al. | 360/125.02 |
| 7,583,472 B2 * | 9/2009 | Matono | 360/125.1 |
| 7,710,685 B2 * | 5/2010 | Kimura et al. | 360/125.09 |

FOREIGN PATENT DOCUMENTS

| | | |
|---|---|---|
| JP | 2002-197611 | 7/2002 |
| JP | 2003-242608 | 8/2003 |
| JP | 2006-323899 | 11/2006 |

* cited by examiner

*Primary Examiner* — Mark Blouin
(74) *Attorney, Agent, or Firm* — Brinks Hofer Gilson & Lione

(57) ABSTRACT

A perpendicular magnetic recording head includes a main magnetic pole layer and an auxiliary yoke layer that overlaps the main magnetic pole layer as viewed in a top view and is magnetically coupled to the main magnetic pole layer. The main magnetic pole layer includes a pole straight part exposed to an opposing surface opposite a recording medium, and a flared part that extends from the pole straight part in a height direction, the flared part broadening in a track width direction as the flared part extends in the height direction. The auxiliary yoke layer includes a flared part that extends from the recording medium-opposing surface, the flared part broadening in the track width direction as the flared part extends in the height direction. The flared part of the auxiliary yoke layer is disposed at a position located closer to the rear side in the height direction than the flared part of the main magnetic pole layer. The flared part of the main magnetic pole layer is formed at a flare angle greater than a flare angle of the auxiliary yoke layer.

7 Claims, 5 Drawing Sheets

PERPENDICULAR MAGNETIC RECORDING HEAD

RELATED APPLICATIONS

This application claims the benefit of priority under 35 U.S.C. §119 to Japanese Patent Application Nos. 2007-091519 filed Mar. 30, 2007 and 2007-142316 filed May 29, 2007, the contents of which are hereby incorporated by reference in their entirety.

BACKGROUND OF THE INVENTION

1. Field of the Invention

The present disclosure relates to a perpendicular magnetic recording head that records information by applying a perpendicular magnetic field to a recording medium.

2. Description of the Related Art

As is widely known, a perpendicular magnetic recording head has a main magnetic pole layer, a return path layer, and a coil layer that provides a recording magnetic field to the main magnetic pole layer and the return path layer. The main magnetic pole layer and the return path layer are laminated with a nonmagnetic layer therebetween and form a surface that opposes a recording medium (hereinafter this surface is referred to as "recording medium-opposing surface"). The area of the main magnetic pole layer exposed to the recording medium-opposing surface is sufficiently smaller than the area of the return path layer exposed to the recording medium-opposing surface. The main magnetic pole layer is magnetically coupled to the return path layer at the side remote from the recording medium-opposing surface in the height direction. The main magnetic pole layer includes a pole straight part exposed to the recording medium-opposing surface and a flared part that connects to the back end of the pole straight part in the height direction. With this arrangement, a strong magnetic field can be applied to a local part of the recording medium. Once electricity is supplied to the coil layer, a recording magnetic field is induced between the main magnetic pole layer and the return path layer. The induced recording magnetic field enters a hard film of the recording medium in a perpendicular fashion from the front end surface of the main magnetic pole layer exposed to the recording medium-opposing surface. The recording magnetic field passes through a soft film of the recording medium and returns to the return path layer to thereby complete magnetic recording on the recording medium in the portion that opposes the main magnetic pole layer.

According to a proposal regarding a perpendicular magnetic recording head, the pole straight part (the portion that is exposed to the recording medium-opposing surface) of the main magnetic pole layer formed on the nonmagnetic layer is rendered to have a trapezoidal shape (bevel shape) that is narrowed at the nonmagnetic insulating layer side when viewed from the recording medium-opposing surface side. This is to increase the recording density and to prevent the generation of fringing at the time of skew. A perpendicular magnetic recording head having such a trapezoidal pole straight part is disclosed in Japanese Unexamined Patent Application Publication Nos. 2002-197611 and 2003-242608. In a perpendicular magnetic recording head, however, when a magnetic domain of the main magnetic pole layer and an auxiliary yoke layer is oriented perpendicular to the recording medium in a state that a recording current does not flow, a phenomenon known as the pole lockup is caused, erasing data recorded on the recording medium. According to a proposal regarding a method of preventing such a pole lockup phenomenon, a surface of a pole tip of the main magnetic pole layer on a trailing side is rendered asymmetrical with respect to the track center. A pole lockup preventing method is disclosed in Japanese Unexamined Patent Application Publication No. 2006-323899.

However, an asymmetrical pole tip can yield an uneven distribution of magnetic filed intensity with respect to the track center.

SUMMARY OF THE DISCLOSURE

The present disclosure provides a perpendicular magnetic recording head that includes a main magnetic pole layer and an auxiliary yoke layer that overlaps the main magnetic pole layer as viewed in a top view and is magnetically coupled to the main magnetic pole layer. The main magnetic pole layer includes a pole straight part exposed to an opposing surface opposite a recording medium, and a flared part that extends from the pole straight part in a height direction. The flared part broadens in a track width direction as the flared part extends in the height direction. The auxiliary yoke layer includes a flared part that extends from the recording medium-opposing surface. The flared part broadens in the track width direction as the flared part extends in the height direction. The flared part of the auxiliary yoke layer is disposed at a position located closer to the rear side in the height direction than the flared part of the main magnetic pole layer. The flared part of the main magnetic pole layer is formed at a flare angle greater than a flare angle of the auxiliary yoke layer.

The flare angle of the auxiliary yoke layer may be designed so as to be equal to or greater than about 45 degrees and smaller than about 70 degrees.

BRIEF DESCRIPTION OF THE DRAWINGS

The components in the figures are not necessarily to scale, emphasis instead being placed upon illustrating the principles of the invention. Moreover, in the figures, like reference numerals designate corresponding parts throughout the different views.

FIGS. 3A to 3C are diagrams showing the relationships between the main magnetic pole layer and the auxiliary yoke layer as viewed from a trailing side, in which FIG. 3A shows the case where a flare angle β of the auxiliary yoke layer is 90 degrees (Comparative Example), FIG. 3B shows the case where the flare angle β of the auxiliary yoke layer is 70 degrees (Example 1), and FIG. 3C shows the case where the flare angle β of the auxiliary yoke layer is 45 degrees (Example 2).

DESCRIPTION OF THE EMBODIMENTS

Exemplary embodiments may be better understood with reference to the drawings, but these examples are not intended to be of a limiting nature. Like numbered elements in the same or different drawings perform equivalent functions.

The present disclosure will now be described with reference to drawings, covering various non-exhaustive embodiments. In each of the drawings, the X direction is the track width direction, the Y direction is the height direction, and the Z direction is the lamination direction in which the layers constituting a perpendicular magnetic recording head H are laminated, or the moving direction of a recording medium M.

Figure 1:
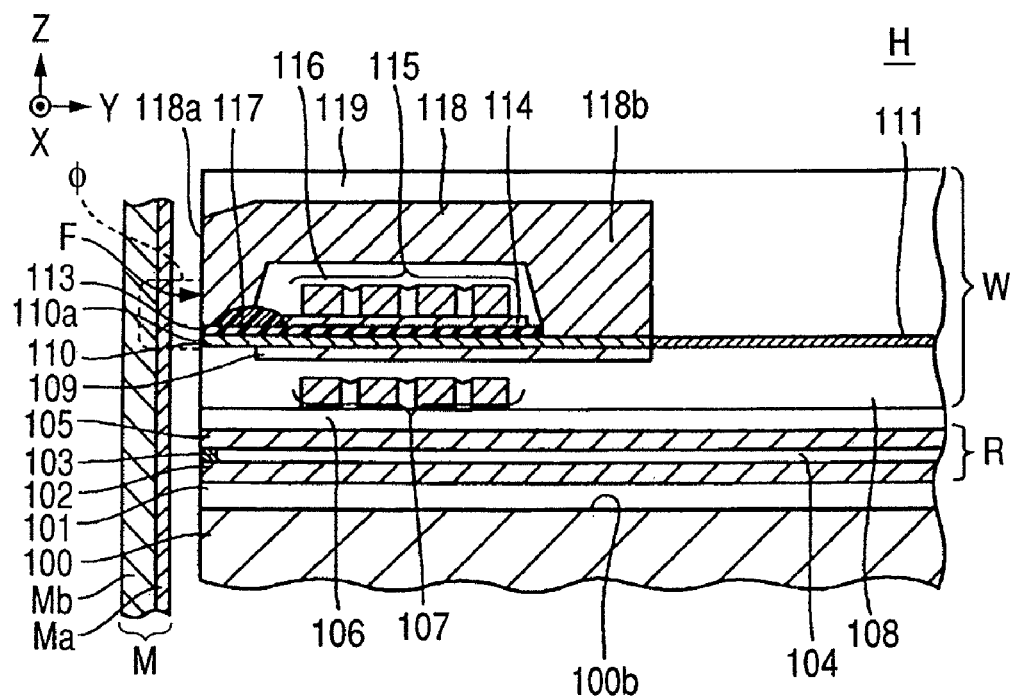
FIG. 1 is a cross-sectional view showing a part of a laminated structure of a perpendicular magnetic recording head according to one embodiment of the present disclosure as viewed in the track width direction.

FIG. 1 is a cross-sectional view showing a part of a laminated structure of a perpendicular magnetic recording head H according to one embodiment of the present disclosure as viewed in the track width direction. The perpendicular magnetic recording head H includes a read section R constituted from thin films laminated on a trailing side-end surface 100b of a slider 100, and a write section W. Writing is conducted by applying a perpendicular magnetic field $\phi$ to a recording medium M to thereby magnetize a hard film Ma of the recording medium M in the perpendicular direction. The recording medium M includes the hard film Ma with a higher residual magnetization at the surface side and a soft film Mb with a higher magnetic permeability at the inner side of the hard film Ma. The recording medium M is, for example, disk-shaped and is rotated by a spindle motor about the center of the disk, which serves as the axis of rotation. The slider 100 is composed of a nonmagnetic material such as $Al_2O_3$ or TiC. A medium-opposing surface F of the slider 100 opposes the recording medium M. As the recording medium M is rotated, the slider 100 floats up from the surface of the recording medium M by the airflow on the surface.

A nonmagnetic insulating layer 101 composed of an inorganic material such as $Al_2O_3$ or $SiO_2$ is formed on the trailing side-end surface 100b of the slider 100. The read section R is formed on the nonmagnetic insulating layer 101. The read section R includes a lower shield layer 102, an upper shield layer 105, an inorganic insulating layer (gap insulating layer) 104 that fills the space between the lower shield layer 102 and the upper shield layer 105, and a read element 103 located in the inorganic insulating layer 104. The read element 103 is a magnetoresistive (MR) element such as AMR (anisotropic MR), GMR (giant MR), and TMR (tunneling MR).

Lower layer coils 107 composed of a conductive material are disposed on a coil insulating underlayer 106 on the upper shield layer 105. For example, the lower layer coils 107 are composed of at least one nonmagnetic metal material selected from the group consisting of Au, Ag, Pt, Cu, Cr, Al, Ti, NiP, Mo, Pd, and Rh. Alternatively, the lower layer coils 107 may be a laminated structure in which these nonmagnetic metal materials are laminated. A nonmagnetic insulating layer 108 is formed around the lower layer coils 107.

A main magnetic pole layer 110 and an auxiliary yoke layer 109 are formed on the nonmagnetic insulating layer 108. The auxiliary yoke layer 109 overlaps the main magnetic pole layer 110 and is magnetically coupled to the main magnetic pole layer 110. The auxiliary yoke layer 109 is composed of a magnetic material having a magnetic flux saturation density lower than that of the main magnetic pole layer 110 and has a function of magnetically coupling to the main magnetic pole layer 110 to guide a magnetic flux to the main magnetic pole layer 110. The main magnetic pole layer 110 is formed on a plating underlayer disposed on the planarized auxiliary yoke layer 109 and the nonmagnetic insulating layer 108. The main magnetic pole layer 110 is composed of a ferromagnetic material having a high saturation magnetic flux density such as Ni—Fe, Co—Fe, or Ni—Fe—Co. An insulating material layer 111 is formed around the main magnetic pole layer 110, and a magnetic gap layer 113, which is a nonmagnetic layer, is formed on the main magnetic pole layer 110. The insulating material layer 111 and the magnetic gap layer 113 are, for example, composed of a nonmagnetic insulating material such as $Al_2O_3$, $SiO_2$, or Al—Si—O. In this embodiment, the auxiliary yoke layer 109 is disposed below the main magnetic pole layer 110. However, the auxiliary yoke layer 109 may be formed above the main magnetic pole layer 110.

Upper layer coils 115 are formed on a coil insulating underlayer 114 formed on the magnetic gap layer 113. As with the lower layer coils 107, the upper layer coils 115 are composed of a conductive material. The upper layer coils 115 are, for example, composed of at least one nonmagnetic metal material selected from the group consisting of Au, Ag, Pt, Cu, Cr, Al, Ti, NiP, Mo, Pd, and Rh. Alternatively, the upper layer coils 115 may have a laminated structure in which these nonmagnetic metal materials are laminated.

The lower layer coils 107 and the upper layer coils 115 have their respective X-direction side ends (not shown) electrically connected to each other to be wound around the main magnetic pole layer 110 or the auxiliary yoke layer 109 such that they form a solenoid. The shape of the coil layers 107 and 115 (magnetic field generating means) are not limited to the solenoid. They may have a spiral shape, for example.

A nonmagnetic insulating layer 116 is formed around the upper layer coil 115. A return path layer (auxiliary magnetic pole layer) 118 composed of a ferromagnetic material such as permalloy is formed over the nonmagnetic insulating layer 116 and the magnetic gap layer 113. The return path layer 118 has a front end surface 118a exposed to the opposing surface F and opposes the main magnetic pole layer 110 at this front end surface 118a with a gap spacing of the opposing surface F. The back end of the return path layer 118 in the height direction is a connecting part 118b connected to the main magnetic pole layer 110. A throat height-defining layer 117 is formed on the magnetic gap layer 113 at a predetermined distance away from the opposing surface F. The throat height-defining layer 117 may be composed of an inorganic or organic material. The throat height of the perpendicular magnetic recording head H is defined by the distance from the opposing surface F to the front edge of the throat height-defining layer 117. The return path layer 118 is covered with a protective layer 119 composed of a nonmagnetic insulating material.

The perpendicular magnetic recording head H having the above-described structure is characterized by the relationships between a flare angle $\alpha2$ of a second flared part 110C of the main magnetic pole layer 110 and a flare angle $\beta$ of a flared part 109B of the auxiliary yoke layer 109. The shape and relationships of the flared parts 110B, 110C, and 109B of the main magnetic pole layer 110 and the auxiliary yoke layer 109 will be described with reference to FIGS. 2 to 4.

Figure 2:
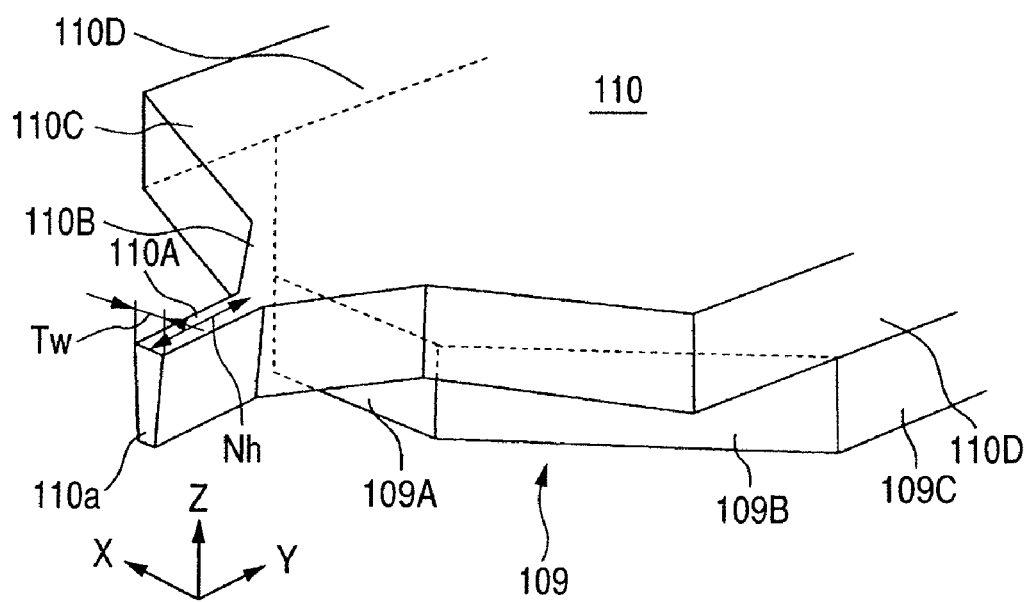
FIG. 2 is a perspective view showing a main magnetic pole layer (two-step flare structure) and an auxiliary yoke layer shown in FIG. 1, corresponding to a first embodiment.

As shown in FIG. 2, the main magnetic pole layer 110 has a pole straight part 110A, a first flared part 110B, a second flared part 110C, and a base part 110D, all of which are integrally formed therewith, in that order from the opposing surface F side opposite the recording medium M. The second flared part 110C is a region for orienting the magnetic domain structures, which are generated in the base part 110D, in the track width direction during excitation. The first flared part 110B is a region for narrowing the recording magnetic field from the base part 110D and the second flared part 110C toward the pole straight part 110A. The first flared part 110B extends from the pole straight part 110A in the height direction and broadens in the track width direction at a first flare angle α1 as the first flared part 110B extends in the height direction, and eventually the first flared part 110B joins the second flared part 110C. The second flared part 110C extends from the first flared part 110B in the height direction (toward the base part 110D) and broadens in the track width direction at a second flare angle α2 as the second flared part 110C extends in the height direction, and eventually the second flared part 110C joins the base part 110D. Here, the flare angles α1 and α2 satisfy the relation: α1<α2.

The pole straight part 110A forms a front end surface 110a exposed to the opposing surface F opposite the recording medium M. The dimension of the pole straight part 110A in the track width direction corresponds to a predetermined write track width Tw, and the dimension in the height direction corresponds to a predetermined neck height Nh. The pole straight part 110A has a trapezoidal (beveled) cross-sectional shape narrowed at the nonmagnetic insulating layer 108 side, over its entire length, as viewed from the opposing surface F side opposite the recording medium M. By beveling the pole straight part 110A, the write track width Tw at a skew angle can be decreased when compared with the case in which the cross-sectional shape is rectangular (not beveled).

The first flared part 110B has a trapezoidal cross-sectional shape narrowed at the nonmagnetic insulating layer 108 side as viewed from the opposing surface F side opposite the recording medium M. The trapezoidal shape of the first flared part 110B is coincident with the cross-sectional shape of the pole straight part 110A at the junction between the first flared part 110B and the pole straight part 110A. The cross-sectional shape of the first flared part 110B gradually changes as the first flared part 110B extends from the pole straight part 110A in the height direction such that the ratio of the length of the long base of the trapezoid to the length of the short base of the trapezoid becomes close to 1, and eventually the first flared part 110B joins the second flared part 110C. The cross-sectional shape of the second flared part 110C is coincident with the cross-sectional shape of the base part 110D at the junction between the second flared part 110C and the base part 110D: the second flared part 11C is rectangular (i.e., the ratio of the length of the long base to the length of the short base is substantially equal to 1). In this way, by increasing the dimension of the flared parts in the track width direction from the first flared part 110B to the base part 110D, magnetic domains can be appropriately controlled. By the magnetic domain control, a main magnetic pole structure is provided which can prevent the generation of the pole lockup.

The auxiliary yoke layer 109 has a front end part 109A, which is a front end of the auxiliary yoke layer 109 in the height direction, that overlaps the second flared part 110C, a flared part 109B that extends from the front end part 109A and broadens in the track width direction at a flare angle β as the flared part 109B extends in the height direction, and a base part 109C connected to the rear end of the flared part 109B in the height direction. The flare angle β of the auxiliary yoke layer 109 is smaller than the second flare angle α2, satisfying the relation: β<α2.

The flared part 109B of the auxiliary yoke layer 109 and the first and second flared parts 110B and 110C of the main magnetic pole layer 110 are rendered so as to be symmetrical with respect to the center line in the track width direction as viewed from the trailing side and the leading side.

Figure 3A:
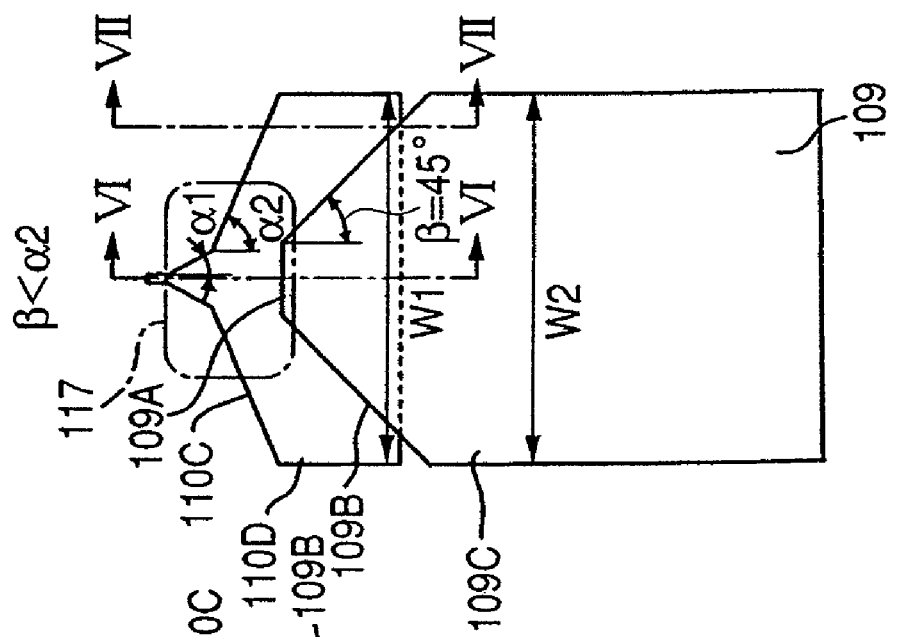
Figure 3B:
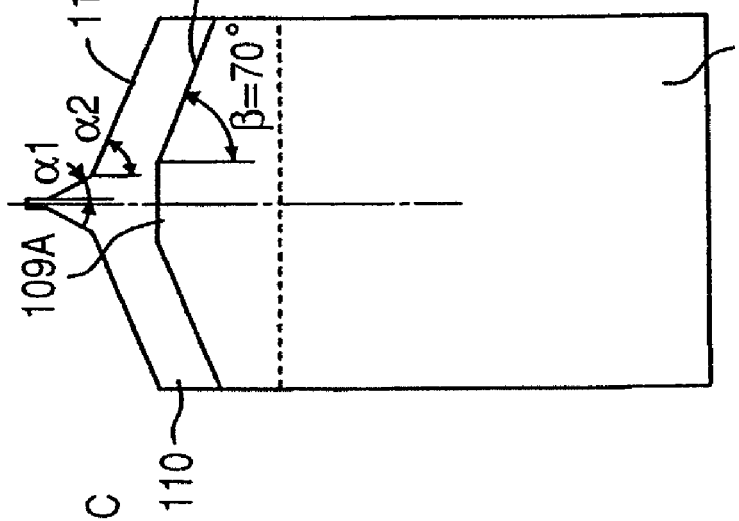
Figure 3C:
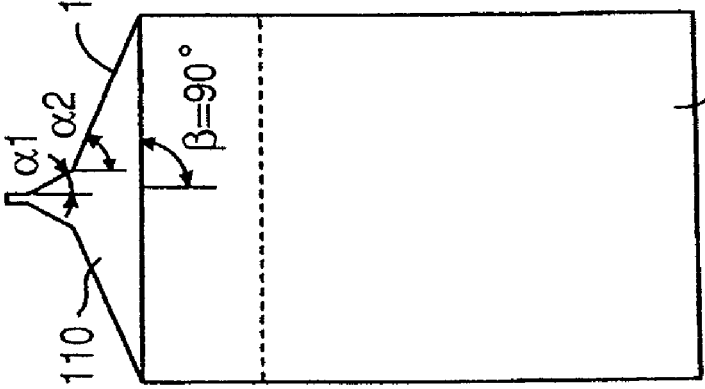

The advantages of the present disclosure will now be described with reference to FIGS. 3A to 3C and FIG. 4 by comparing Examples 1 and 2 of the present disclosure with Comparative Example. In these examples, the flare angles α1 and α2 were set to 40 degrees and 70 degrees, and the flare angle β was changed. FIG. 3A shows the case where the flare angle β of the auxiliary yoke layer 109' was 90 degrees, corresponding to Comparative Example. FIG. 3B shows the case where the flare angle β of the auxiliary yoke layer 109 was 70 degrees, corresponding to Example 1. FIG. 3C shows the case where the flare angle β of the auxiliary yoke layer 109 was 45 degrees, corresponding to Example 2. In Comparative Example, the flare angles satisfy the relation: α1<α2<β. In Examples 1 and 2, the flare angle β is smaller than the first and second flare angles α1 and α2. In other words, in Examples 1 and 2, the second flare angle α2 of the main magnetic pole layer 110 is greater than the flare angle β of the auxiliary yoke layer 109. However, in Comparative Example, the second flare angle α2 of the main magnetic pole layer 110 is smaller than the flare angle β' of the auxiliary yoke layer 109'.

The flared part 109B of the auxiliary yoke layer 109 is disposed at a position located closer to the rear side in the height direction than the second flared part 110C of the main magnetic pole layer 110. The flared part 109B of the auxiliary yoke layer 109 is formed within the border of the second flared part 110C of the main magnetic pole layer 110.

Figure 4:
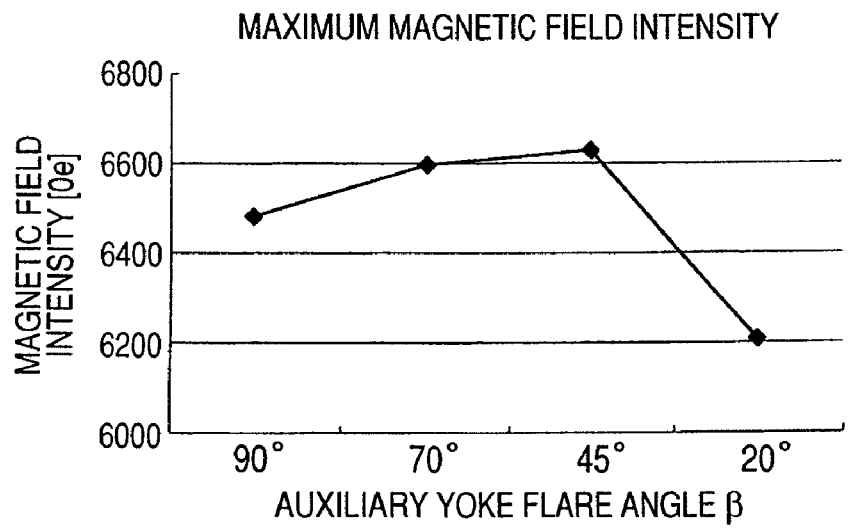
FIG. 4 is a graph showing simulation results of a maximum magnetic field intensity when the flare angle β of the auxiliary yoke layer is varied from 90 degrees to 20 degrees.

Table 1 and FIG. 4 show the simulation results of a magnetic field intensity of the recording medium M by changing the flare angle β of the auxiliary yoke layer 109 from 90 degrees to 70 degrees, 45 degrees and 20 degrees in the main magnetic pole layer 110 and the auxiliary yoke layer 109 of Comparative Example and Examples 1 and 2. In FIG. 4, the horizontal axis represents the flare angle β, and the vertical axis represents a magnetic field intensity (unit: Oe=$10^3/4\pi$ A/m).

TABLE 1

| | Flare Angle β [Degree] | | | |
|---|---|---|---|---|
| | 90 | 70 | 45 | 20 |
| Max. Magnetic Field Intensity [Oe] | 6479 | 6595 | 6627 | 6207 |

According to the simulation results, the maximum magnetic field intensity increased as the flare angle β decreased from 90 degrees and became the maximum at the flare angle β of 45 degrees. The maximum magnetic field intensity decreased as the flare angle β decreased smaller than 45 degrees. From the simulation results, it was found that the maximum magnetic field intensity increased when the flare angle β is smaller than 90 degrees increased, preferably satisfying the relation: 45 degrees≦β≦70 degrees; i.e., the flare angle β is preferably smaller than the second flare angle α2. When the flare angle β is smaller than the first flare angle α1, it is difficult to concentrate magnetic fluxes on the front end of the main magnetic pole layer 110, decreasing the magnetic field intensity in the recording medium M.

Figure 5:
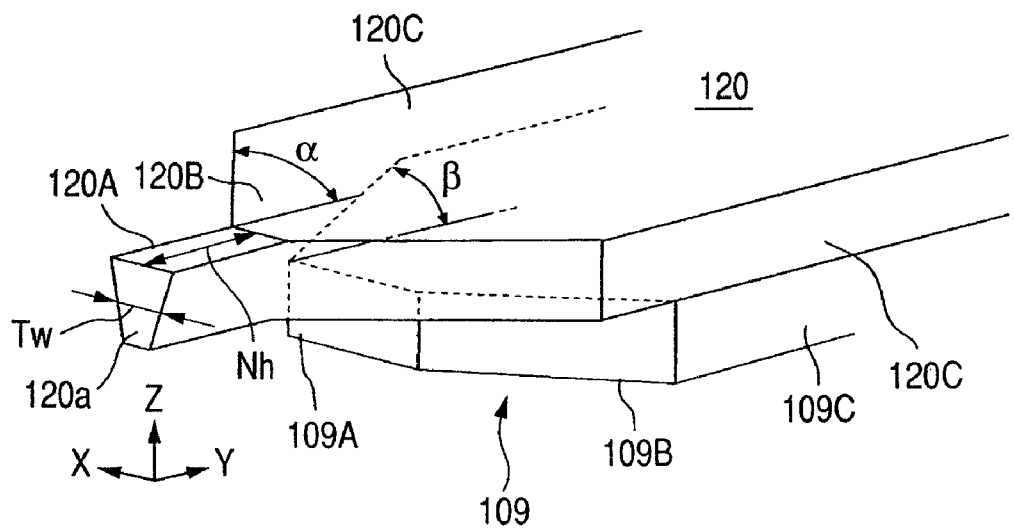
FIG. 5 is a perspective view showing a perpendicular magnetic recording head having a main magnetic pole layer with a one-step flare structure, corresponding to a second embodiment.

Although the main magnetic pole layer 110 of this embodiment is formed into a two-step flare structure with the first and second flared parts 110B and 110C, the main magnetic pole layer 110 may have a one-step flare structure shown in FIG. 5, for example, or a flare structure with three or more steps.

A one-step flared structure corresponding to a second embodiment is shown in FIG. 5. The main magnetic pole layer 120 with the one-step flared structure shown in FIG. 5 has a pole straight part 120A, a flared part 120B, and a base part 120C, all of which are integrally formed therewith, in that order from the opposing surface side opposite the recording medium. The pole straight part 120A forms a front end surface 120a exposed to the opposing surface opposite the recording medium. The dimension of the pole straight part 120A in the track width direction corresponds to a predetermined write track width Tw, and the dimension in the height direction corresponds to a predetermined neck height Nh. The pole straight part 120A has a trapezoidal (beveled) cross-sectional shape narrowed at the nonmagnetic insulating layer 108 side, over its entire length, as viewed from the opposing surface opposite the recording medium. The flared part 120B has the same shape as the pole straight part 120A, i.e., the cross-sectional shape viewed from the opposing surface opposite the recording medium is trapezoidal, narrowed at the nonmagnetic insulating layer 108 side. The trapezoidal shape of the flared part 120B is coincident with the cross-sectional shape of the pole straight part 120A at the junction between the flared part 120B and the pole straight part 120A. The cross-sectional shape of the flared part 120B gradually changes as the flared part 120B extends from the pole straight part 120A to the base part 120C in the height direction such that the ratio of the length of the long base of the trapezoid to the length of the short base of the trapezoid becomes close to 1 at the junction between the flared part 120B and the base part 120C.

The auxiliary yoke layer 109 is the same as that of the first embodiment shown in FIGS. 2 and 3. Specifically, the auxiliary yoke layer 109 has a front end part 109A, which is a front end of the auxiliary yoke layer 109 in the height direction, that overlaps the flared part 120B as viewed in a top view and a flared part 109B that extends from the front end part 109A and broadens in the track width direction at a flare angle β as the flared part 109B extends in the height direction. The flare angle β of the auxiliary yoke layer 109 is smaller than the flare angle α, satisfying the relation: β<α. In the second embodiment, the flare angle β of the flared part 109B preferably satisfies the relation: 45 degrees≦β<70 degrees.

In the first and second embodiments described above, the flared parts 109B, 110B, 110C, and 120B of the auxiliary yoke layer 109 and the main magnetic pole layer 110 and 120 are rendered so as to be symmetrical with respect to the center line in the track width direction as viewed from the trailing side and the leading side (i.e., as viewed in a top view). The auxiliary yoke layer 109 may be formed at the trailing side or the leading side with respect to the main magnetic pole layer 110 or 120.

Figure 6:
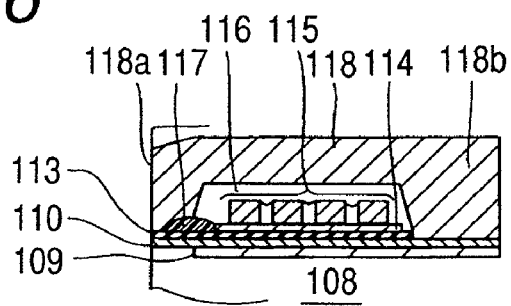
FIG. 6 is a cross-sectional view taken along line VI-VI in FIG. 3C.
Figure 7:
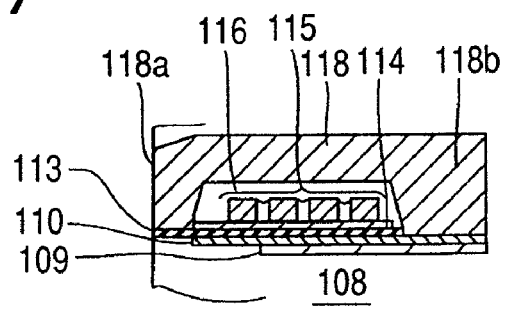
FIG. 7 is a cross-sectional view taken along line VII-VII in FIG. 3C.

In the first and second embodiments described above, the horizontal width (in the track width direction) of the base part 110D or 120C of the main magnetic pole layer 110 is designed substantially equal to the horizontal width of the base part 109C of the auxiliary yoke layer 109. That is, in FIG. 3C, the width W1 of the base part 110D in the track width direction and the width W2 of the base part 109C in the track width direction satisfies the relation: W1=W2. A cross-sectional view of the main magnetic pole layer 110 and the auxiliary yoke layer 109 according to the embodiments taken along the center line in the track width direction (i.e., along line VI-VI in FIG. 3C) are shown in FIG. 6. At the central portion of the cross-section, the throat height-defining layer 117 is disposed between the main magnetic pole layer 110 and the return path layer 118. The area of an opposing surface opposite the main magnetic pole layer 110 and the return path layer 118 is small. There is therefore little possibility of magnetic flux leakage (loss). However, in a portion (FIG. 7) taken along line VII-VII in FIG. 3C, the throat height-defining layer 117 is not disposed between the main magnetic pole layer 110 and the return path layer 118. The distance between the main magnetic pole layer 110 and the return path layer 118 is small. There is therefore high possibility of magnetic flux leakage (loss).

Figure 8:
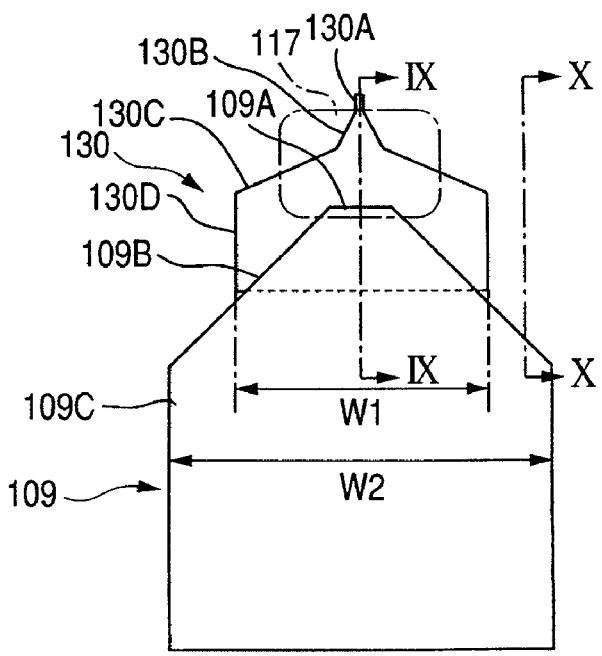
FIG. 8 is a diagram showing the relationships between the main magnetic pole layer and the auxiliary yoke layer as viewed from a trailing side, according to another embodiment, in which as viewed in a top view, the horizontal width of the auxiliary yoke layer 109 is designed so as to be greater than the horizontal width of the main magnetic pole layer 110.
Figure 9:
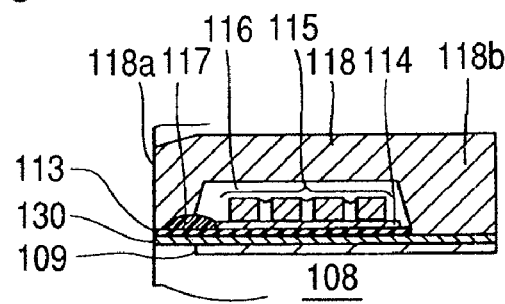
FIG. 9 is a cross-sectional view taken along line IX-IX in FIG. 8.
Figure 10:
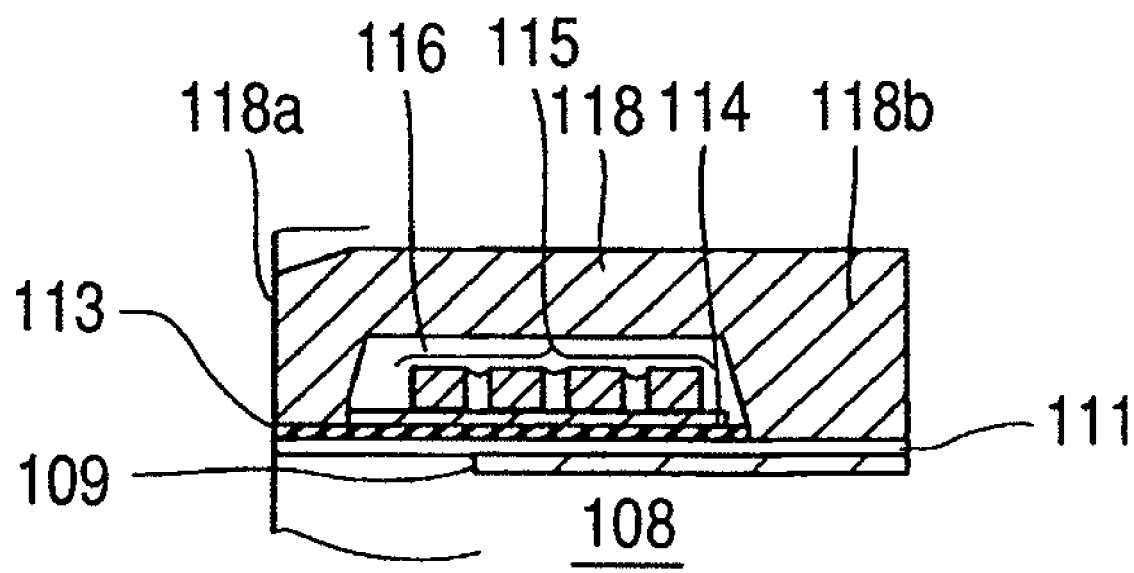
FIG. 10 is a cross-sectional view taken along line X-X in FIG. 8.

To suppress such magnetic flux loss, according to another embodiment of the present disclosure, the horizontal width (the width in the track width direction) of the auxiliary yoke layer 109 is designed greater than the horizontal width of a main magnetic pole layer 130 as viewed in a top view. FIG. 8 is a top view showing main parts of this embodiment. FIG. 9 is a cross-sectional view taken along line IX-IX in FIG. 8. FIG. 10 is a cross-sectional view taken along line X-X in FIG. 8. The main magnetic pole layer 130 has a pole straight part 130A, first and second flared parts 130B and 130C, and a base part 130D. The width of the base part 130D is smaller than the width of the base part 110D of the main magnetic pole layer 110. The constructions of the pole straight part 130A and the first and second flared parts 130B and 130C are the same as those of the pole straight part 110A and the first and second flared parts 110B and 110C of the corresponding main magnetic pole layer 110.

As is obvious from FIG. 9, in this embodiment, at the central portion of the cross-section, the throat height-defining layer 117 is disposed between the main magnetic pole layer 130 and the return path layer 118. The area of an opposing surface opposite the main magnetic pole layer 130 and the return path layer 118 is small. There is therefore little possibility of magnetic flux leakage (loss). As is obvious from FIG. 10, although at an edge in the width direction of the main magnetic pole layer 130, the throat height-defining layer 117 is not disposed between the main magnetic pole layer 130 and the return path layer 118, the distance between the main magnetic pole layer 130 and the return path layer 118 is large. There is therefore little possibility of magnetic flux leakage (loss), and thus an improvement in recording capability is expected.

In this embodiment, the width W1 of the base part 130D of the main magnetic pole layer 130 and the width W2 of the base part 109C of the auxiliary yoke layer 109 are designed so as to satisfy the relation: W1<W2. Preferably, the widths W1 and W2 satisfy the relation: $1.5 \times W1 \leqq W2$.

When the above relation is satisfied, by the base part 109C of the wide auxiliary yoke layer 109, a magnetic field generated from the coils (the lower layer coils 107 and the upper layer coils 115) are efficiently narrowed and concentrated. The amount of magnetic fluxes leaking to the return path layer 118 from the main magnetic pole layer 130 is reduced, and thus an improvement in recording capability is expected.

In the main magnetic pole layer 120 and the auxiliary yoke layer 109 having the one-step flared part 120B shown in FIG. 5, by designing the width W1 of the base part 120C of the main magnetic pole layer 120 and the width W2 of the base part 109C of the auxiliary yoke layer 109 so as to satisfy the relation: W1<W2, preferably, $1.5 \times W1 \leqq W2$, the magnetic flux loss can be decreased as with the embodiment shown in FIG. 8. Thus, it is possible to provide an advantage that the recording capability is improved.

The terms and descriptions used herein are set forth by way of illustration only and are not meant as limitations. Those skilled in the art will recognize that many variations can be made to the details of the above-described embodiments without departing from the underlying principles of the disclosure. The scope of the disclosure should therefore be determined only by the following claims (and their equivalents) in which all terms are to be understood in their broadest reasonable sense unless otherwise indicated.

What is claimed is:

1. A perpendicular magnetic recording head, comprising:
a main magnetic pole layer; and
an auxiliary yoke layer that overlaps the main magnetic pole layer as viewed in a top view and is magnetically coupled to the main magnetic pole layer, the main magnetic pole layer including:
a pole straight part exposed to an opposing surface opposite a recording medium, and
a flared part that extends from the pole straight part in a height direction, the flared part broadening in a track width direction as the flared part extends in the height direction,
wherein the auxiliary yoke layer includes a flared part that extends from the recording medium-opposing surface, the flared part broadening in the track width direction as the flared part extends in the height direction,
wherein the flared part of the auxiliary yoke layer is disposed at a position located closer to the rear side in the height direction than the flared part of the main magnetic pole layer,
wherein the flared part of the main magnetic pole layer is formed at a flare angle greater than a flare angle of the auxiliary yoke layer,
wherein the flared part of the main magnetic pole layer has a first flared part that is disposed between the pole straight part and a second flared part, the first flared part broadens in the track width direction at a first flare angle as the first flared part extends in the height direction, the second flared part broadens in the track width direction at a second flare angle as the second flared part extends in the height direction, and
wherein the second flare angle is designed so as to be greater than the flare angle of the auxiliary yoke layer.

2. The perpendicular magnetic recording head according to claim 1, wherein the flare angle of the auxiliary yoke layer is designed so as to be equal to or greater than about 45 degrees and smaller than about 70 degrees.

3. The perpendicular magnetic recording head according to claim 1, wherein the first flare angle is smaller than the second flare angle and is equal to or smaller than the flare angle of the auxiliary yoke layer.

4. The perpendicular magnetic recording head according to claim 1, further comprising a return path layer disposed in the opposing surface opposite the recording medium and laminated on a nonmagnetic layer on the main magnetic pole layer,
wherein the main magnetic pole layer includes a base part integrally formed with the pole straight part and the flared part of the main magnetic pole layer and extending in the height direction,
wherein the auxiliary yoke layer includes a base part integrally formed with the flared part of the auxiliary yoke layer and extending in the height direction, and
wherein the width of the base part of the auxiliary yoke layer in the track width direction is designed so as to be greater than the width of the base part of the main magnetic pole layer in the track width direction.

5. The perpendicular magnetic recording head according to claim 4, wherein a width W1 of the base part of the main magnetic pole layer and a width W2 of the base part of the auxiliary yoke layer is designed so as to satisfy the relation: $1.5 \times W1 \leq W2$.

6. The perpendicular magnetic recording head according to claim 1, wherein a width of the pole straight part in the track width direction is constant along the height direction.

7. The perpendicular magnetic recording head according to claim 1, wherein a cross-sectional shape of the pole straight part is trapezoidal as viewed from the opposing surface,
wherein a cross-sectional shape of the first flared part is trapezoidal as viewed from the opposing surface, and
wherein the cross-sectional shape of the first flared part gradually changes as the first flared part extends from the pole straight part in the height direction such that the ratio of the length of the long base of the trapezoid to the length of the short base of the trapezoid becomes close to 1.

* * * * *